Jan. 4, 1955 E. B. ANDERSON 2,698,527
UNIVERSAL JOINT ASSEMBLY
Filed Aug. 15, 1951 3 Sheets-Sheet 2
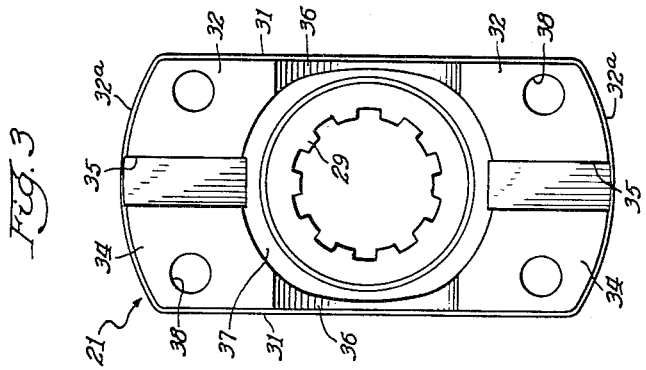
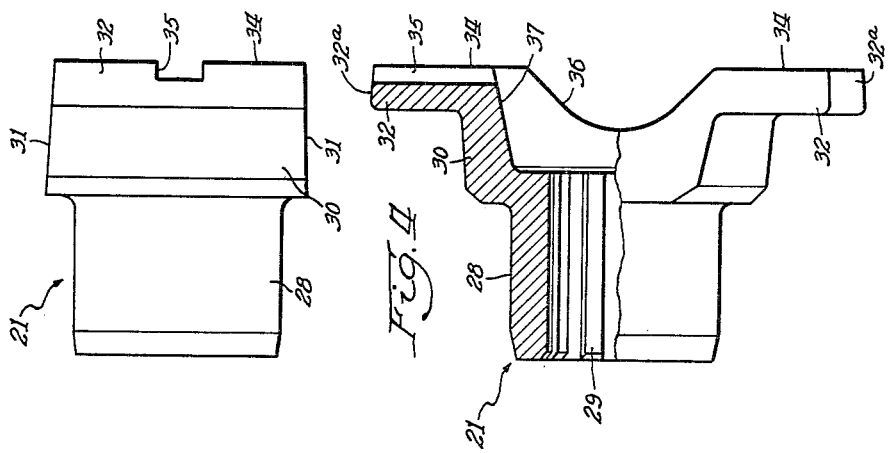
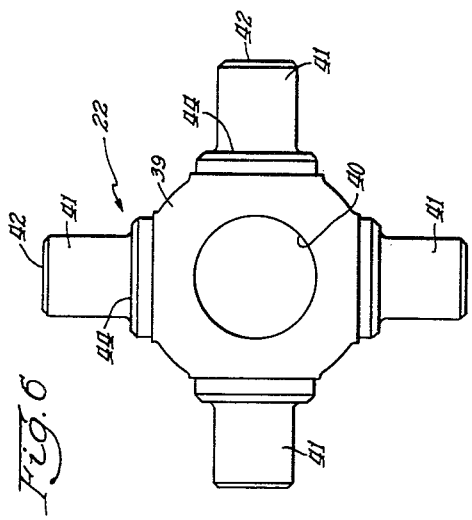
Inventor
Edmund B. Anderson
By: H. J. Schmid Atty

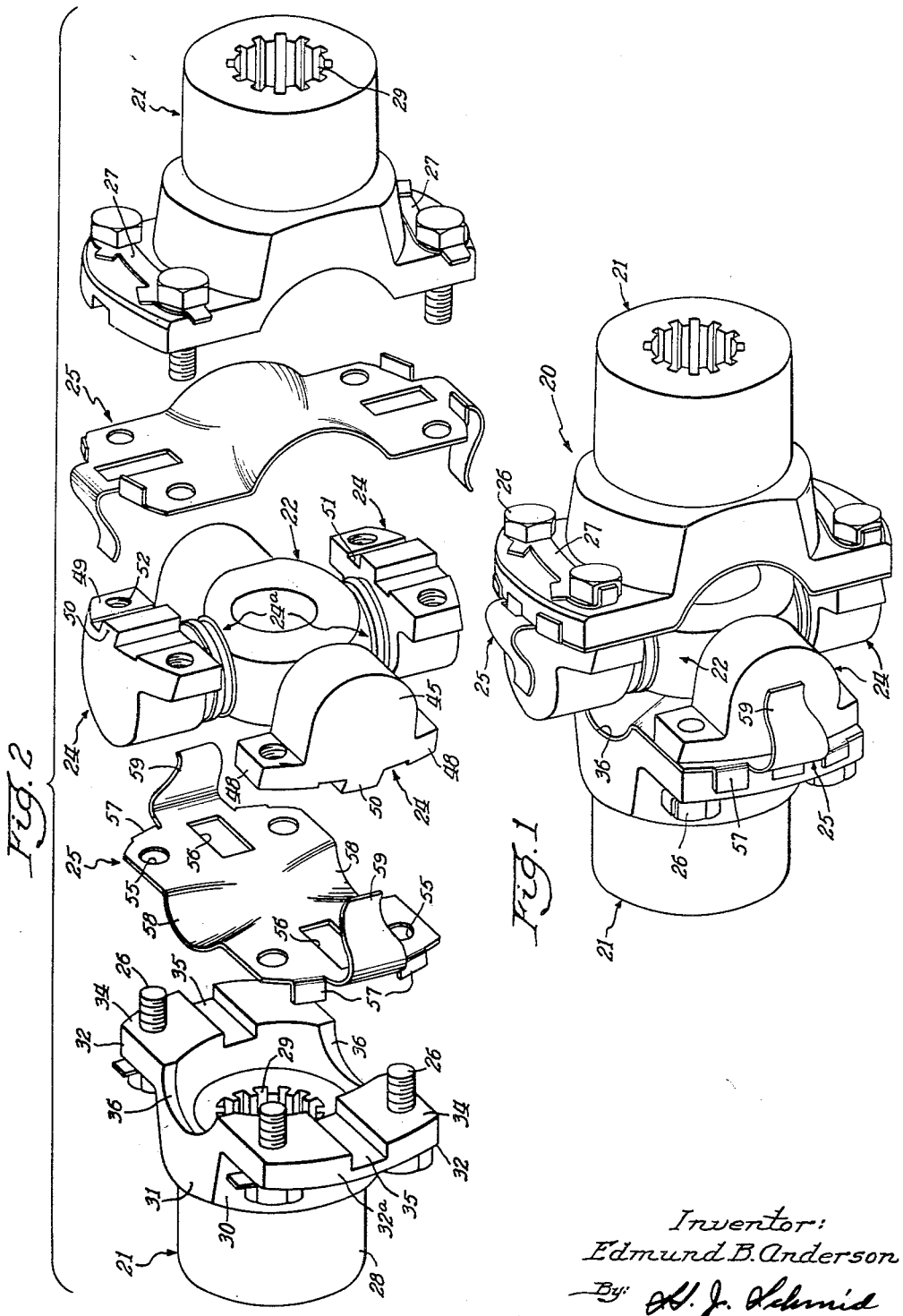

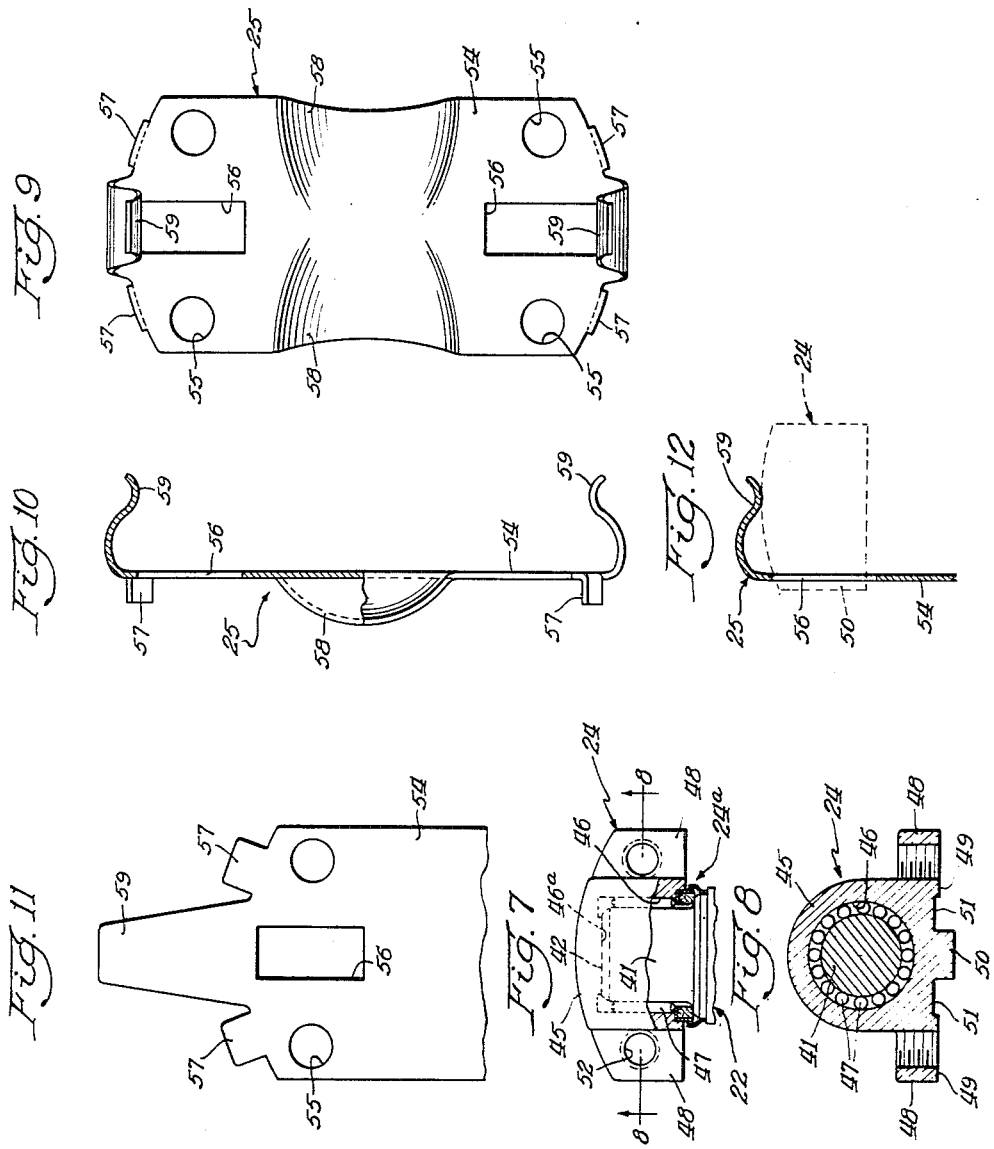

United States Patent Office 2,698,527
Patented Jan. 4, 1955

2,698,527
UNIVERSAL JOINT ASSEMBLY

Edmund B. Anderson, Rockford, Ill., assignor to Borg-Warner Corporation, Chicago, Ill., a corporation of Illinois Application August 15, 1951, Serial No. 241,927

12 Claims. (Cl. 64—17)

This invention relates to a universal joint assembly and more particularly to a universal joint of the Cardan type, such as shown and described in Patent No. 1,985,669.

In previous universal joint assemblies of this type, considerable manufacturing costs are necessarily incurred to accurately form and machine the mating and coacting parts of the spider and the yokes to close and critical tolerances so that the spider is centered with respect to the yoke axis to prevent unbalance of the shafts, connected to the yokes, tending to cause wobbling of the shafts, and preloading of the spider trunnions with consequent noise, and galling generating heat consuming the lubricant. In addition, close tolerances are necessary between the mating parts for eliminating all end play of the spider in the bearing cups, as well as providing an adequate seal between the relatively rotatable bearing cups and the spider trunnion shoulders.

It is an object of the present invention to provide an improved universal joint assembly embodying improved features including means for automatically centering the spider on the joint axis and for eliminating spider end play relative to the yokes.

Another object of the invention is to provide a universal joint assembly embodying self-centering means for the spider.

A further object of the invention is to provide an improved universal joint assembly including means for resiliently holding the bearing cups in proper seated relation on the spider trunnions so that, when the bearing cups are secured to the yokes, all spider end play will be eliminated.

An additional object of the invention is to provide simple and inexpensive flexible members in a universal joint assembly for centering the spider with respect to the yokes, for eliminating all end play between the spider and the bearing cups, and for assuring a proper seal between the bearing cups and the spider to prevent egress of lubricant and ingress of foreign matter.

Still another object of the present invention is to provide an improved universal joint assembly including spring retainers with means for centering the retainers and the spider with respect to the yokes and the joint axis through the use of resilient fingers which also serve to hold the bearing cups in seated relation on the spider trunnions.

Other objects, features and advantages will become apparent from the following detailed description of a preferred embodiment of the invention taken in conjunction with the accompanying drawings, in which:

Fig. 1 is a perspective view of a universal joint assembly embodying the present invention;

Fig. 2 is an exploded perspective view of the joint assembly of Fig. 1;

Fig. 3 is an end elevational view of one of the similar yokes of the joint assembly of Fig. 1;

Fig. 4 is a side elevational view, partly in section, of the yoke shown in Fig. 3;

Fig. 5 is a top view of the yoke of Fig. 3;

Fig. 6 is a side view of the spider of the universal joint assembly shown in Fig. 1;

Fig. 7 is a fragmentary portion of the assembly shown in Fig. 1, illustrating one of the similar bearing cups in side elevation, a part of the cup being broken away to show a spider trunnion and seal in section;

Fig. 8 is a sectional view taken on line 8—8 of Fig. 7;

Fig. 9 is a plan view of one of the spring retainers utilized in the universal joint assembly of Fig. 1;

Fig. 10 is a side view, partly in section, of the spring retainer of Fig. 9;

Fig. 11 is a fragmentary plan view of a flat sheet metal blank utilized for forming the spring retainer of Fig. 9; and Fig. 12 is a fragmentary sectional view of one end portion of one of the spring retainers showing the assembled relationship of the spring retainer with respect to one of the bearing cups shown in dotted outline.

Figs. 1 and 2 illustrate a universal joint assembly 20 including a pair of yokes 21, a spider 22, bearing cups 24 and a pair of spring retainers 25. The bearing cups 24 are journalled on the spider 22 in two diametrically opposite pairs, and the respective pairs are fixedly secured to the yokes 21 by bolts 26. When the bolts 26 are properly secured, they may be retained against inadvertent loosening clips 27. Lubricant seals 24a, as shown in Fig. 7, are provided between the inner ends of the bearing cups 24 and the adjacent portions of the spider 22.

The construction details of the yokes 21 are illustrated in Figs. 3–5. Each of the yokes comprises a sleeve portion 28 with internal longitudinal splines 29, an increased diameter shoulder portion 30 with opposite flat sides 31 and radially oppositely extending yoke arms 32. The yoke arms 32 are provided with flat end faces 34 disposed in a plane perpendicular to the axis of the yoke. Arcuate surfaces 32a are formed on the yoke arms 32 and these surfaces are concentric to the axis of the yoke. Aligned centering grooves or slots 35 are formed in the faces 34 of the yoke arms 32. Arcuate notches 36 are provided in the shoulder portion 30 between the yoke arms 32 of each yoke in order to afford clearance for the bearing cups 24 secured to the other yoke. A central tapered cavity 37 is formed within the shoulder portion 30. A pair of bolt apertures 38 are formed through each of the yoke portions 32 and are of large enough diameter to receive the bolts 26 loosely to permit limited radial adjustment of the bearing cups 24 before the bolts are drawn tight.

As shown in Fig. 6, the spider 22 comprises a central portion 39 with a central aperture 40 and two pairs of diametrically oppositely extending trunnions 41 forming two trunnion pivot axes at right angles to one another and intersecting the axis of the joint as seen in Fig. 1. The trunnions 41 include outer flat ends 42 and inner trunnion shoulders 44.

The bearing cups 24 pivotally connect the yokes 21 to the respective pairs of spider trunnions 41. As shown in detail in Figs. 7 and 8, each of the bearing cups has a barrel portion 45 with an internal bore 46 receiving one of the spider trunnions 41 rotatably mounted in the cup by means of antifriction bearings 47. The bore 46 is closed at its outer end by a wall having a flat surface 46a engaging the end 42 of one of the spider trunnions 41. Each bearing cup 24 has a pair of laterally extending ears 48 provided with faces 49 disposed in a plane parallel to the axis of the bore 46. Midway between the faces 49 of each bearing cup is formed a guide lug or tongue 50, the tongues 50 being received within the grooves 35 of the yokes to pisition the bearing cups and consequently the spider 22 with respect to the yokes 21. Clearance grooves 51 are formed on each side of the lug 50. A threaded bolt aperture 52 is provided through each of the ears 48 for receiving the threaded ends of the bolts 26.

According to the present invention, means are provided for automatically centering spider 22 with respect to the yokes 21 and for preventing end play of the spider in the bearing cups 24. More particularly, spring retainers 25, shown in detail in Figs. 9–12, and preferably formed of cold-rolled, high carbon spring steel such as the type designated as SAE 1050, are utilized for this purpose. The retainers are identical in structure and function and are respectively disposed between a yoke 21, a pair of cups 24 and spider 22. Each retainer includes a generally flat body portion 54 having bolt apertures 55 respectively alignable with the bolt apertures 38 in the adjacent yoke portions 32 and the threaded openings 52 of the adjacent bearing cups. A pair of slots 56 are formed in the retainer body portion 54 for loosely receiving the bearing cup lugs 50. For centering the retainers 25 with respect to the yokes 21, each of the retainers is provided with a pair of bent-over centering tabs 57 at each end of the retainer body portion 54 and extending at substantially right angles relative to the body portion 54 and at an angle to each other to define arcuate portions of a circle having a diameter slightly smaller than the diameter of the circle in which the concentric arcuate surfaces 32a of the yoke lie. Hence, when the tabs 57 of a retainer are engaged with the surfaces 32a of a yoke 21, the tabs will firmly grip the yoke and act to automatically center the retainer with respect to the yoke.

To allow clearance for the bearing cups attached to the opposite yoke and to lend stiffness to the retainer body portion 54, ribs 58 are formed in the central section of the body portion. These ribs are of such a size as to fit within the clearance notches 36 formed in the yokes.

In order to center the axis of the spider 22 on the common axis of the yokes 21 and thereby to position the axes of the spider trunnions to intersect the common axis of the yokes, as shown in Figs. 1 and 2, the retainers 25 are provided with resilient flanges or fingers 59 engaging the bearing cups 24. Each retainer is formed as a stamping, as shown in Fig. 11, having the fingers 59 initially formed with tapering side edges, and thereafter the fingers 59 are shaped so that the intermediate portions of the fingers 59 are bent convexly outwardly and the tip portions are bent concavely outwardly with the fingers extending generally oppositely with respect to the tabs 57. It is important that the fingers 59 be identical to one another both as to location relative to the tabs 57 and as to configuration, in order that the fingers will exert equal pressures on the ends of the respective bearing cups to center the spider with respect to the respective yokes and to urge the bearing cup surfaces 46a into seating engagement with the ends 42 of the trunnions.

In the assembly of the universal joint the bearing cups 24 are positioned on the spider trunnions 41 and the bearing cups are loosely secured to the yokes with the retainers 25 between the yoke sand cups. The retainer tabs 27 serve to center the respective retainers on the yokes and the resilient fingers 59 bear resiliently inwardly on the outward ends of opposite bearing cups to seat the same on the trunnions and to center the spider 22 with respect to the associated yokes. The closely fitting lugs 50 of the cups and the grooves 35 of the yokes coact with the resilient fingers by guiding the bearing cups and the spider in lines perpendicular to the yoke axes. Therefore, when the bolts 26 are tightened, the spider will be centered and balanced with respect to the yokes to eliminate shaft vibration and wobble. As the bearing cups are seated on the spider trunnions before the bolts are tightened all end play of the spider with respect to these bearing cups will be eliminated. The resilient preload effected by the retainers on the bearing cups is sufficient to seat the same on the spider trunnions but is not sufficient to cause undesirable friction between the bearing cups and the trunnions such as might occur with positive engagement alignment means with resultant galling, heat generation and lubricant consumption. In addition, the pressure exerted on the ends of the bearing cups will insure proper running seals between the cups and the trunnion shoulders by means of the seals 24a in order to prevent egress of lubricant and the ingress of dirt.

From the above description it will be readily apparent that the present invention provides an improved universal joint assembly including simple and efficient means for automatic centering of the spider with respect to the yokes. The self-centering means also insure that the bearing cups are seated on the trunnion ends so that end play of the spider is eliminated. In addition, the resilient inwardly directed centering pressure of the spring retainers exerted on the bearing cups serves to insure proper seals between the cups and the trunnion shoulders during operation of the joint. Thus, this invention eliminates the need for expensive machining operations required to provide tolerances of the engaging portions of the yokes and bearing cups of prior universal joints to obtain comparable coordination between the spider, the bearing cups and the two yokes. For example, it is not necessary, in the production of universal joints embodying this invention, to provide close tolerance mating surfaces of the yokes and cups to align the spider and yoke axes and to prevent too much clearance resulting in end play axially of the spider trunnion or too little clearance resulting in binding between the bearing cups and the trunnion ends. In addition, tolerances in regard to the length of the trunnions and the thicknesses of the bearing cup end walls are no longer critical so that the universal joint assembly can be manufactured and assembled at a reduced cost.

It will be understood that modifications and variations may be effected without departing from the scope of the novel concepts of the present invention.

I claim:

1. In a universal joint assembly, a spider having opposite bearing portions, bearing elements rotatably engaged with said bearing portions, a yoke having portions spaced from and rotatable about an axis and connectible to said bearing elements, a retainer having portions engaging said yoke to center said retainer on said axis and having other portions resiliently urging said bearing elements in engagement with said spider portions for centering the spider with respect to said axis; and means for connecting said bearing elements to the yoke.

2. In a universal joint assembly, a spider having opposite bearing portions, bearing elements rotatably engaged with said bearing portions, a yoke having portions spaced from and rotatable about an axis and connectible to said bearing elements, a retainer having spaced resilient portions, said retainer being connected to said yoke to position said resilient portions equidistantly from said axis for resiliently urging said bearing elements in engagement with said spider portions to center said spider with respect to said axis for centering the spider with respect to the yoke, and means for connecting said bearing elements to the yoke.

3. In a universal joint assembly, a spider having a pair of diametrically opposite trunnions, bearing cups journalled on said trunnions, a yoke having portions connectible to said cups, a retaining member having a rigid body connected to said yoke and provided with flexible end portions bearing resiliently on said bearing cups to seat the same on said trunnions and including means centering said retaining member with respect to the yoke whereby said retaining member portions coact with said bearing cups to center the spider with respect to the yoke, and means for connecting the yoke portions to the bearing cups.

4. In a universal joint assembly rotatable about an axis, a spider having opposite bearing portions, bearing elements rotatably engaged with said bearing portions, a yoke having portions connectible to said bearing elements, said yoke portions having arcuate ends formed on a common circle with a center located on the joint axis, a retainer having portions resiliently urging said bearing elements in engagement with said spider portions, said retainer including tabs located on a common circle and engaging said yoke portion arcuate ends to center the retainer with respect to the yoke whereby said retainer portions coact with the bearing elements to center the spider with respect to the yoke, and means for connecting said bearing elements to the yoke.

5. In a universal joint assembly, a spider having a pair of diametrically opposite bearing portions, bearing elements rotatably engaged with said bearing portions, a yoke having portions connectible to said bearing elements, a retainer plate having flexible curved end portions resiliently urging said elements into engagement with said spider bearing portions, said retainer having parts engaging said yoke to center the retainer with respect to the yoke whereby the retainer portions coact with the bearing elements to center the spider with respect to said yoke in one plane, means centering the spider with respect to the yoke in a plane perpendicular to said one plane, and means securing the yoke portions to the bearing elements.

6. In a universal joint assembly, a spider having a pair of diametrically opposite trunnions, bearing cups journalled on said trunnions, a yoke having portions connectible to said cups, a retaining plate having its opposite end portions bearing resiliently on said bearing cups to seat the same on said trunnions, said retaining plate having portions engaging said yoke portions to center the retaining plate with respect to the yoke whereby said retaining plate end portions coact with the bearing cups to center the spider with respect to the yoke in one plane, means associated with said bearing cups and said yoke portions having interengaging parts centering the spider with respect to the yoke in a plane perpendicular to said one plane, and means connecting the yoke portions to the bearing cups.

7. In a universal joint assembly, a spider having a pair of diametrically opposite trunnions, a pair of bearing cups journalled on said trunnions and having spaced attachment portions with an axially extending center lug therebetween, a yoke having portions connectible to said attachment portions and including centering grooves adapted for receiving said centering lugs in close fitting relation for centering said spider with respect to said yoke in one plane, a retainer plate rigidly connected to said yoke and having flexible portions resiliently urging said bearing cups in engagement with said trunnions and including means centering said retainer plate with respect to said yoke whereby the retainer plate portions coact with the bearing cups to center the spider with respect to the yoke in a plane perpendicular to said one plane, and means for connecting said bearing cup attachment portions to said yoke portions.

8. In a universal joint assembly rotatable about an axis, a spider having a pair of diametrically oppositely extending trunnions, bearing cups journalled on said trunnions and having end walls adapted to about the outer ends of the trunnions, said bearing cups each including spaced attachment portions with coplanar faces parallel to the axis of the cup and a centering lug between said portions, a yoke having portions extending radially of said joint axis and connectible to said bearing cup attachment portions and including centering grooves adapted for receiving said centering lugs in close fitting relation for centering said spider with respect to said yoke in one plane, a retainer having spring end portions bearing resiliently inwardly on the outer ends of said bearing cups to retain the end walls thereof in engagement with the trunnions, said retainer having opposed tabs abutting opposite portions of the yoke portions to center the retainer with respect to the yoke whereby said retainer end portions coact with said bearing cups to center the spider with respect to the yoke in a plane perpendicular to the said one plane, and means for connecting the yoke portions to the bearing cup attachment portions.

9. In a universal joint assembly rotatable about an axis, a spider having a pair of diametrically oppositely extending trunnions, bearing cups journalled on said trunnions and having end walls adapted to abut the outer ends of the trunnions, said bearing cups each including spaced attachment portions with coplanar faces parallel to the axis of the cup and a centering lug between said portions, a yoke having portions extending radially of said joint axis and connectible to said bearing cup attachment portions and including centering grooves adapted for receiving said centering lugs in close fitting relation for centering said spider with respect to said yoke in one plane, said yoke portions having opposite ends formed on a common circle with a center located on the joint axis, a retainer having spring end portions bearing resiliently inwardly on the outer ends of said bearing cups to retain the end walls thereof in engagement with the trunnions, said retainer having opposed tabs located on a common circle and engaging said yoke portion arcuate ends to center the retainer with respect to the yoke whereby said retainer end portions coact with said bearing cups to center the spider with respect to the yoke in a plane perpendicular to the said one plane, and means for connecting the yoke portions to the bearing cup attachment portions.

10. A universal joint comprising a spider having two sets of opposite bearing portions, two sets of bearing elements rotatably engaged with said bearing portions, a pair of yokes having portions adapted for securing to the respective sets of bearing elements, a pair of retainer plates rigidly connected to respective yokes and having flexible curved end portions resiliently urging the respective sets of bearing elements into rotatable engagement with said spider bearing portions and including means centering said retainer plates with respect to the respective yokes whereby the retainer plate portions coact with the bearing elements to center the spider with respect to both yokes, and means for connecting said bearing elements to the respective yokes.

11. A universal joint comprising a spider having two pairs of diametrically opposite trunnions, two pairs of bearing cups journalled on said trunnions, a pair of yokes each having portions adapted for securing to the respective pairs of bearing cups and each having arcuate locating surfaces concentric to the axis of the yoke, a pair of retainers having portions resiliently urging the respective pairs of bearing cups into seating relation on said trunnions and having arcuate surfaces complementary to and engaging said arcuate surfaces of said yokes for centering said retainers with respect to the yokes whereby the retainer portions coact with said bearing cups to center the spider with respect to the yokes in different planes, said bearing cups and said yoke portions having interengaging parts centering the spider with respect to the yokes in planes respectively perpendicular to said first mentioned planes, and means for connecting the yoke portions to the respective pairs of bearing cups.

12. A universal joint comprising a spider having two pairs of diametrically opposite trunnions, bearing cups journalled on said trunnions and having end walls adapted to abut the outer ends of the trunnions, shaft-receiving members having yoke portions adapted for securing to opposed pairs of bearing cups, a pair of retainer members each having identical spring end portions bearing resiliently inwardly on the outer ends of respective opposed pairs of bearing cups to retain the end walls thereof against the respective trunnion ends, said retaining members having opposed tabs abutting opposite portions of the respective yoke portions to center the retainer members with respect to the shaft-receiving members, and means for connecting the yoke portions to the respective bearing cups.

References Cited in the file of this patent

UNITED STATES PATENTS

| Number | Name | Date |
|---|---|---|
| 1,943,814 | Cutting | Jan. 16, 1934 |
| 1,985,669 | Swenson | Dec. 25, 1934 |
| 2,114,861 | Slaght | Apr. 19, 1938 |
| 2,228,715 | Wollner | Jan. 14, 1941 |